(12) United States Patent
Tay (10) Patent No.: US 6,917,380 B1
(45) Date of Patent: Jul. 12, 2005

(54) ONE TIME PROGRAMMABLE SOLID-STATE DEVICE

(75) Inventor: Hiok-Nam Tay, Irvine, CA (US)

(73) Assignee: ESS Technology, Inc., Fremont, CA (US)

(*) Notice: Subject to any disclaimer, the term of this patent is extended or adjusted under 35 U.S.C. 154(b) by 918 days.

(21) Appl. No.: 09/680,041

(22) Filed: Oct. 5, 2000

(51) Int. Cl.[7] .................................................. H04N 9/64
(52) U.S. Cl. ...................................... 348/247; 348/294
(58) Field of Search ................................ 348/246, 247, 348/294, 341, 241

(56) References Cited

U.S. PATENT DOCUMENTS

| | | | | |
|---|---|---|---|---|
| 5,410,511 A | * | 4/1995 | Michiyama | 365/185.22 |
| 5,521,639 A | * | 5/1996 | Tomura et al. | 348/243 |
| 6,141,453 A | * | 10/2000 | Banham et al. | 382/240 |
| 6,275,191 B1 | * | 8/2001 | Lesea et al. | 343/700 MS |
| 6,396,539 B1 | * | 5/2002 | Heller et al. | 348/246 |
| 6,532,514 B1 | * | 3/2003 | Haroun et al. | 711/103 |
| 2002/0001219 A1 | * | 1/2002 | Forbes et al. | 365/145 |

FOREIGN PATENT DOCUMENTS

JP       2000004403 A  *  1/2000         H04N/5/335

\* cited by examiner

*Primary Examiner*—Tuan Ho
*Assistant Examiner*—Yogesh Aggarwal
(74) *Attorney, Agent, or Firm*—Farjami & Farjami LLP (57) ABSTRACT

A one time programmable solid-state device is provided such that the programmable solid-state device includes a programmable memory unit embedded in a die and a driver circuit that programs the programmable memory unit. The one time programmable solid-state device also includes an access circuit that enables access to the programmable memory unit. In an example operation when the one-time programmable solid-state is a solid-state image device, the one-time programmable solid-state device performs the process of identifying an address of a defective pixel in a photosensor having a plurality of pixels arranged in a two-dimensional array in the die and storing the address in the programmable memory unit that is embedded in the die of the solid-state imaging device.

56 Claims, 8 Drawing Sheets

ONE TIME PROGRAMMABLE SOLID-STATE DEVICE

BACKGROUND OF THE INVENTION

1. Technical Field

This invention relates generally to programmable solid-state devices, and more particularly, to permanently programmable solid-state devices.

2. Related Art

Solid-state imaging devices (also referred to as image devices or imagers) have broad applications in many areas including commercial, consumer, industrial, medical, defense and scientific fields. Solid-state imaging devices convert a received image from an object into a signal indicative of the received image. Solid-state imaging devices are fabricated from semiconductor materials (such as silicon or gallium arsenide) and include photosensitive imaging arrays (photosensors) of light detecting picture elements, or pixels, (also known as photodetectors) interconnected to generate analog signals representative of the received image. Examples of solid-state imaging devices include charge coupled devices (CCD), photodiode arrays, charge injection devices (CID), hybrid focal plane arrays and complementary metal oxide semiconductor (CMOS) imaging devices.

Photosensors of the solid-state imaging devices are typically formed in an array structure, with rows and columns of photodetectors (such as photodiodes, photoconductors, photocapacitors or photogates) which generate photo-charges proportional to the radiation (such as light) reflected from an object and received by the photosensor. The period of exposure of a photosensor by incident radiation is referred to generally as the integration period. An exposure shutter may control exposure of the photosensor to incident photons. The exposure shutter may be, for example, electrically, mechanically or electro-magnetically operated. The photo-charges are created by photons striking the surface of the solid-state (i.e. semiconductor) material of the photodetectors within the photosensor. As photons strike a photodetector, free charge carriers (i.e., electron-hole pairs) are generated in an amount proportional to the incident photon radiation. The signals from each photodetector may be utilized, for example, to display a corresponding image on a monitor or to provide information about the optical image.

Each photodetector includes a detecting area (also known as the photosensitive area or the detector area) and photodetector circuitry within a common integrated circuit die. The photodetectors receive a portion of the reflected light received at the solid-state imaging device, and collect photo-charges corresponding to the incident radiation intensity falling upon the photodetector' detecting area of the die. The photo-charges collected by each photodetector are converted to an output analog signal (analog charge signal) or a potential representative of the level of energy reflected from a respective portion of the object. The analog signal (or potential) is then converted to a digital voltage value and processed to create an image.

The detecting area of each photodetector is typically smaller than the actual physical photodetector dimensions because of the space constraints caused by manufacturing processes, presence of the photodetector circuitry (such as the active elements in CMOS photodetectors) in addition to the photodetector and the proximity of adjacent photodetectors. The percentage ratio of the detector area to the overall photodetector (i.e., pixel) area is typically referred to as the optical "fill factor."

Where CCD imaging devices typically suffer from low yields and high power consumption and are often expensive to produce and require a specialized fabrication facility dedicated to CCDs, CMOS imaging devices are lower in overall require less power, and have a higher level of circuit integration on the die that enables "camera-on-a-chip" capabilities. Additionally, CMOS imaging devices are typically manufactured in a standard CMOS wafer fabrication facility, and may also reduce the size of the solid-state imaging device through circuit integration.

Additionally, CMOS technology is capable of significantly higher access rates (i.e. frame rates) than CCD technology at the same or lower levels of circuit noise, because elements may be designed to operate in parallel. In CCD circuits, a single amplifier transforms charge to voltage and must support the total data rate of the imager frame. As a result in CCD imaging devices, the amplifier noise becomes dominant for image sizes over several hundred thousand photodetectors at about 30 frames per second (FPS). In contrast, in CMOS imaging devices, multiple amplifiers are utilized to allow a longer settling time between applications and a significant y higher frame rate while maintaining superior noise rejection. Additionally, CMOS imagers may easily be equipped with a precision analog-to-digital converter ("ADC") on the imager chip.

CCDs devices having photosensors are commonly found in digital imaging devices such as digital cameras and video cameras. Digital imaging devices may alternatively employ CMOS technology for generating digital images. In the manufacture of conventional CCD and CMOS imaging devices, the re are often a number of defective photodetectors in each array. These defective photodetectors may produce a signal indicating the presence of bright light even when no light is incident on the photodetector, or may produce a signal indicating no light even when bright light is incident on the photodetector. Defective photodetectors (also referred to as defective pixels) are caused by a number of factors including, a local crystal defect within the semiconductor material. These defective pixels often result in degraded picture quality from the solid-state imaging device.

An image processor typically processes the digital voltage values corresponding to the photo-charges collected by the photodetectors in the photosensor. In certain circumstances, the image processor may perform image correction to minimize degradation of the image due to defective pixels in the photosensor. Typically, the positions or locations of the defective pixels are fixed within the photosensor. To facilitate image correction, the location of defective pixels may be identified and stored in advance of image processing. In conventional solid-state imaging devices, the locations of the defective pixels are typically determined during the digital camera assembly stage. In a known example, one way of identifying the defective pixels is to expose the photosensor of the solid-state imaging device with uniform incident photons (i.e., illuminate the photosensor with light) for a predetermined time period, so that all photodetectors in the photosensor receive the same amount of light during that time period. The charge collected in each pixel is then accessed.

Each pixel is expected to collect the same amount of charge because each pixel structure is identical and exposed with the same amount of incident photons for the same period of time. Thus, in this example, the defective pixels are those which did not collect the expected amount of charge. The processor then identifies and generates a list of defective pixel locations within the photosensor.

Once the defective pixel locations are known, they are recorded in an external memory chip. In a known system, the memory chips typically utilized are erasable programmable read-only memory chips, or "EPROMs." The EPROMs are typically placed on a printed circuit board (PCB) for the device (e.g., a digital camera) in which the associated photodetector is to be utilized.

There are several disadvantages to storing defective pixels in this manner. First, utilizing an external memory chip adds extra steps and thus increases the assembly time of the device in which the memory chip is utilized (e.g., a digital camera, or a USB "universal-serial bus" peripheral). In addition, the size of the device in which the memory chip is utilized must be increased to provide space for the separate memory chip. Furthermore, the overall cost to manufacture the device is increased due to both the increased assembly time, and the requirement of an extra external memory chip on the PCB. Finally, the need for an additional memory chip increases the number of external electrical connections and increases the complexity of the device and opportunities of malfunctions.

Thus, there is a need in the art for a process and system for storing addresses of defective pixels in an imaging device for later retrieval that decreases the overall assembly time of the device in which the solid-state imaging device is utilized, is relatively inexpensive to manufacture, is reduced in size, and is relatively simple to implement in the fabrication process.

SUMMARY

Broadly conceptualized, the one time programmable (OTP) solid-state device may permanently store information associated with the solid-state device in a programmable memory unit embedded in a die within the OTP solid-state device for later retrieval. An example implementation of the system architecture of the one time programmable solid-state device may include a programmable memory unit embedded in a die within the one time programmable solid-state device. The one time programmable solid-state device may further include and a driver circuit that programs the programmable memory unit and an access circuit that enables access to the programmable memory unit.

In an example operation when the one-time programmable solid-state is a solid state image device, the one-time programmable solid-state device performs the process of identifying an address of a defective pixel in a photosensor having a plurality of pixels arranged in a two-dimensional array in the die and storing the address in the programmable memory unit that is embedded in the die of the solid-state imaging device.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The components in the figures are not necessarily to scale, emphasis instead being placed upon illustrating the principals of the invention. Moreover, in the figures, like reference numerals designate corresponding parts throughout the different views.

DETAILED DESCRIPTION OF THE PREFERRED EMBODIMENTS

Figure 1:
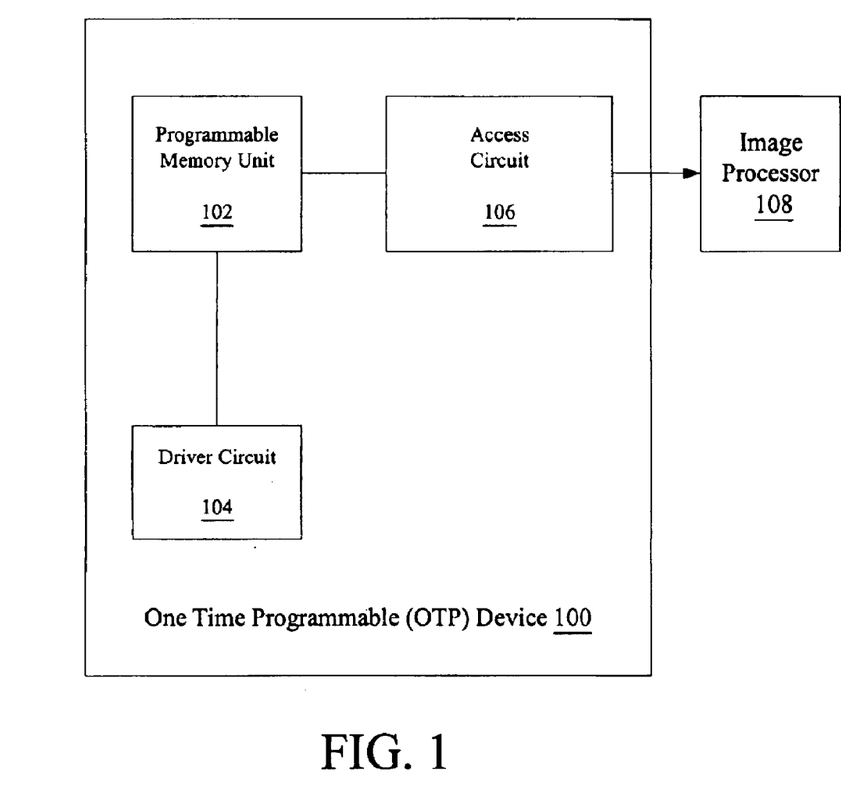
FIG. 1 is a system block diagram illustrating an exemplary implementation of a one time programmable (OTP) device.

In FIG. 1, a one time programmable "OTP" device 100 is illustrated. The OTP device 100 typically includes a programmable memory unit 102, a driver circuit 104, and an access circuit 106. The OTP device 100 is embedded within the die of a solid-state (i.e., semiconductor) integrated circuit chip ("IC"), and is thus on the same substrate as the IC. The solid-state IC may be, for example, a solid-state imaging device (such as a CCD, CMOS or CID) utilized in a digital camera or an application-specific IC (ASIC) used in a USB peripheral.

As an example, in solid-state imaging device, it is typically necessary to identify bad (i.e., defective) pixels (i.e., photodetectors) in the photosensor (i.e., photosensitive imaging array) of the imaging device before image processing occurs so that the image processor may perform image correction to compensate for the defective pixels. To perform image correction during image processing, an image processor 108 may obtain the location of each defective pixel in advance. As a result, the OTP device 100 may be fabricated directly into the solid-state imaging device chip (rather than on a separate external memory chip). As another example, a typical universal serial bus (USB) peripheral generally has specific device configuration information. Rather than storing this configuration information onto a separate memory chip, the OTP device 100 may be selectively fabricated directly onto an ASIC for use in the USB peripheral. In each of these examples, the desired information to be stored may then be encoded in the programmable memory unit 102 of the OTP device 100 during chip fabrication or, alternatively, during final testing.

The programmable memory unit 102 includes non-volatile memory cells. In the example implementation of FIG. 1, the programmable memory unit 102 is a write once programmable memory unit. The programmable memory unit 102 (also referred to as the "memory array") is an array of metal-oxide-semiconductor field-effect transistors "MOSFETs." MOSFETs are well known in the art and generally include a source, a drain and a gate with an insulating layer on the surface of the gate. The source and drain are referred to as the "terminals" of a MOSFET. The insulating layer is typically made of oxide (such as silicon oxide "$SiO_2$") and is referred to as the gate oxide. Each MOSFET in the programmable memory unit 102 is a memory cell and stores either a logic state 1 or a logic state 0, depending on whether the gate oxide of the particular MOSFET has been broken down. The transistors in the programmable memory unit 102 are referred to generically as memory bits or gates.

The OTP device 100 also includes a driver circuit 104 that drives the programmable memory unit 102. The driver circuit 104 includes a number of logic inverters that drive the terminals of the MOSFETs in the programmable memory unit 102, and a number of high-voltage drivers (e.g., amplifiers) that drive the gates of the MOSFETs in the programmable memory unit 102. When the programmable memory unit 102 is encoded, the drivers drive the voltage levels into the MOSFETs to predetermined values based on whether a logic state 1 or logic state 0 is to be represented in the MOSFET.

The OTP device 100 further includes access circuit 106. The access circuit 106 has a number of amplifiers that output a logic state 1 or logic state 0 from a given MOSFET corresponding to the state of breakdown or intactness of the gate oxide of that MOSFET.

Figure 2:
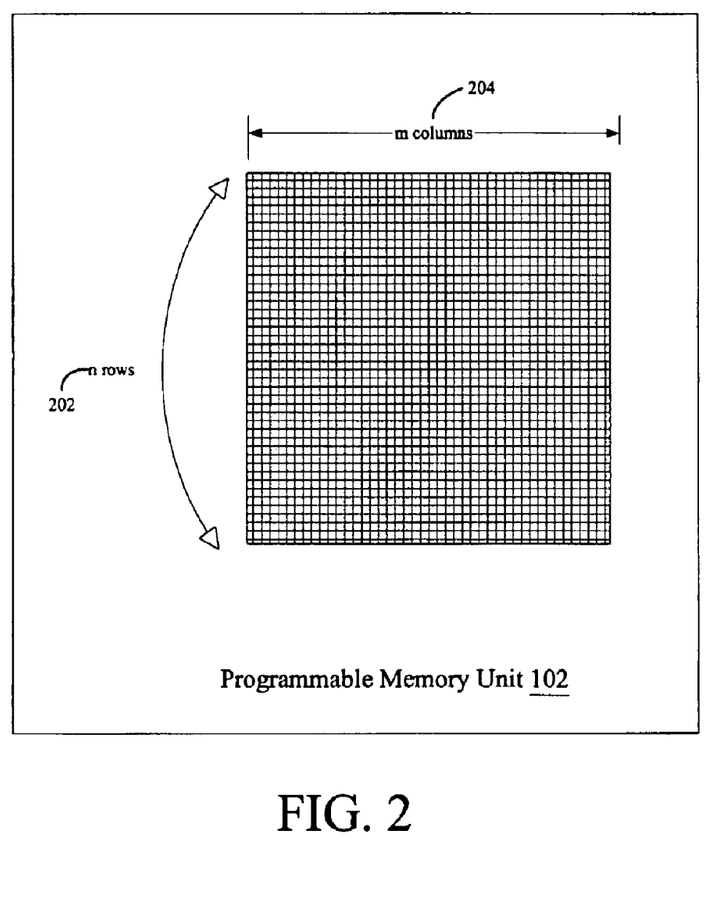
FIG. 2. is a diagram of an exemplary implementation of the programmable memory unit shown in FIG. 1.

In FIG. 2, a planar view of the programmable memory unit 102 from FIG. 1 is shown. The programmable memory unit 102 is an array of memory cells (i.e., transistors) having "n" rows 202, FIG. 2, of pixels and "m" columns 204 of pixels. The number of n rows 202, is typically equal to the number of possible memory locations in the programmable memory unit 102, FIG. 1. In solid-state imaging device applications, each memory location in the programmable memory unit 102 stores a defective pixel address (i.e., the location of a defective pixel in the photosensor). In USB peripheral applications, each memory storage location in the programmable memory unit 102 is a configuration value associated with the particular USB peripheral (e.g., the data range for a modem). In both examples, the number of m columns 204 is typically equal to the number of bits that may be stored in each memory location of the programmable memory unit 102. As an example, a total of "n" defective pixel addresses may be stored in the programmable memory unit 102, and each defective pixel address may be up to "m" bits in length. Similarly, a total of "n" configuration values may be stored in the programmable memory unit 102, and each configuration value may be up to "m" bits in length.

In a solid-state imaging device, a defective pixel addresses may be identified by exposing the photosensor with uniform incident photons (i.e., illuminating the photosensor with light) for a predetermined amount of time, so that all the pixels in the photosensor receive the same amount of light during the exposure time. The charge collected in each pixel of the photosensor is then accessed. Each "good" pixel (i.e., non-defective pixel) collects the same amount of charge because each pixel has an identical architecture and each pixel is ideally exposed to the same amount of photons for the same period of time. Thus, a processor may identify the pixels that do not collect the appropriate amount of charge, and generate a list of their addresses (i.e., locations) within the photosensor.

The generated list of locations is then stored in the programmable memory unit 102. The programmable memory unit 102 may store up to "n" defective pixel addresses because there are n rows of memory. Additionally, the addresses of the defective pixel addresses may be up to "m" bits in length. Thus, the first m/2 bits of each memory location (i.e., row) in the programmable memory unit 102 correspond to a row number in the photosensor of the solid-state imaging device, and the last m/2 bits of each memory-storage location in the programmable memory unit 102 correspond to a column number in the photosensor.

Figure 3:
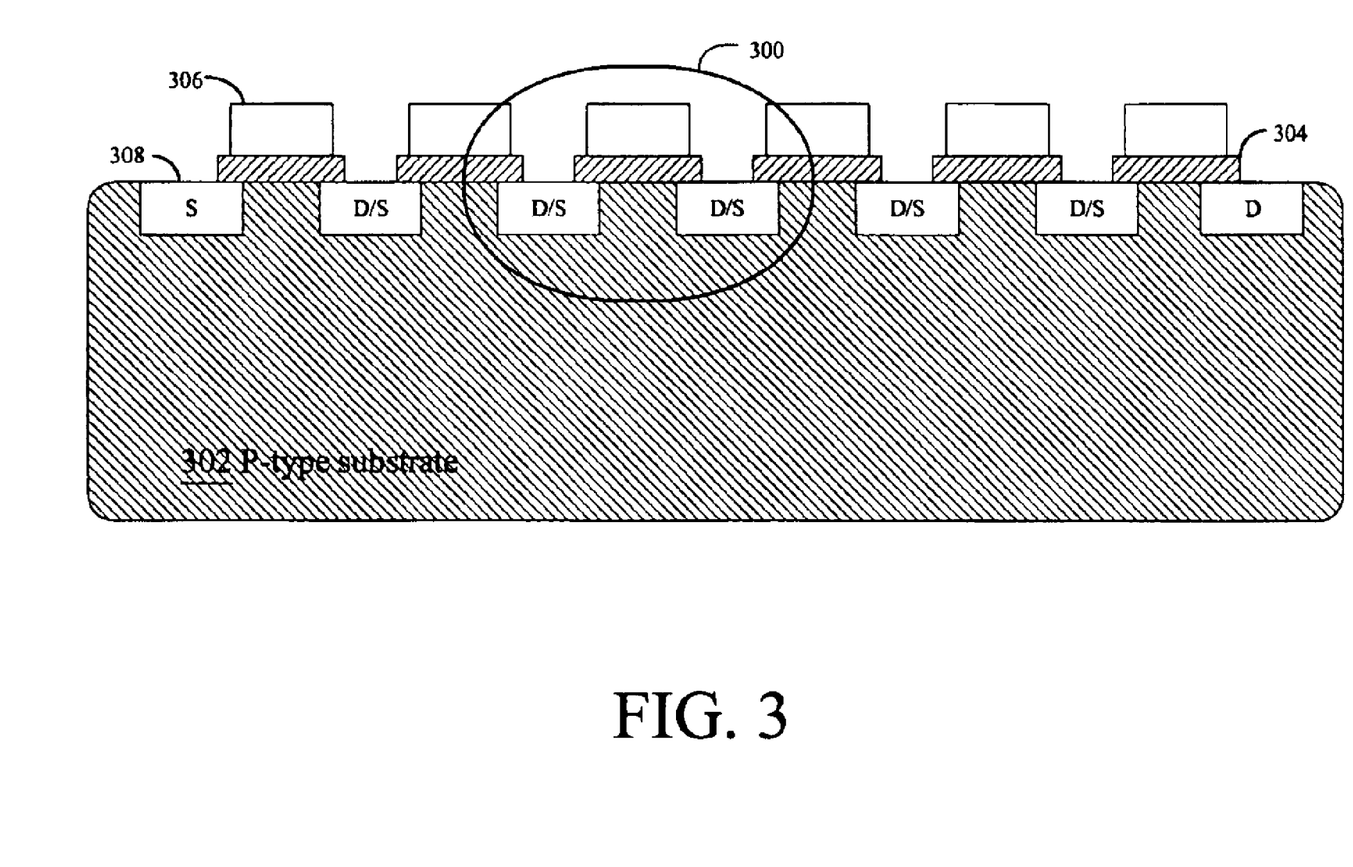
FIG. 3 is a cross sectional view illustrating a portion the programmable memory unit of FIG. 2.

FIG. 3 is a cross sectional view of a portion of the substrate of the programmable memory unit 102, FIG. 1. Specifically, FIG. 3 illustrates a portion of a row of n-channel MOSFETs (NMOS FETs) 300 on a substrate of p-type doping 302. However, it is appreciated by those skilled in the art that the invention may also utilize p-channel MOSFETs on a substrate of n-type doping. Similarly, n-channel MOSFETs may be fabricated into a deep p-type doped well diffusion in an n-type substrate, or p-channel MOSFETs may be fabricated into a deep n-type doped well diffusion in a p-type substrate. Typically, to fabricate the NMOS FETs 300 during wafer processing, a thin layer of oxide 304 is formed on the p-type substrate 302, polysilicon 306 is deposited onto the oxide 304, and the n-type sources and drains (terminals) 308 are then diffused into the p-type substrate 302, leaving the oxide 304 and polysilicon 306 layers as the gates. It is appreciated that the invention is not limited to use of MOSFETs for memory bits. As an example, if MOS capacitors are utilized, the resulting programmable memory unit 102 is an array of MOS capacitors.

Figure 4:
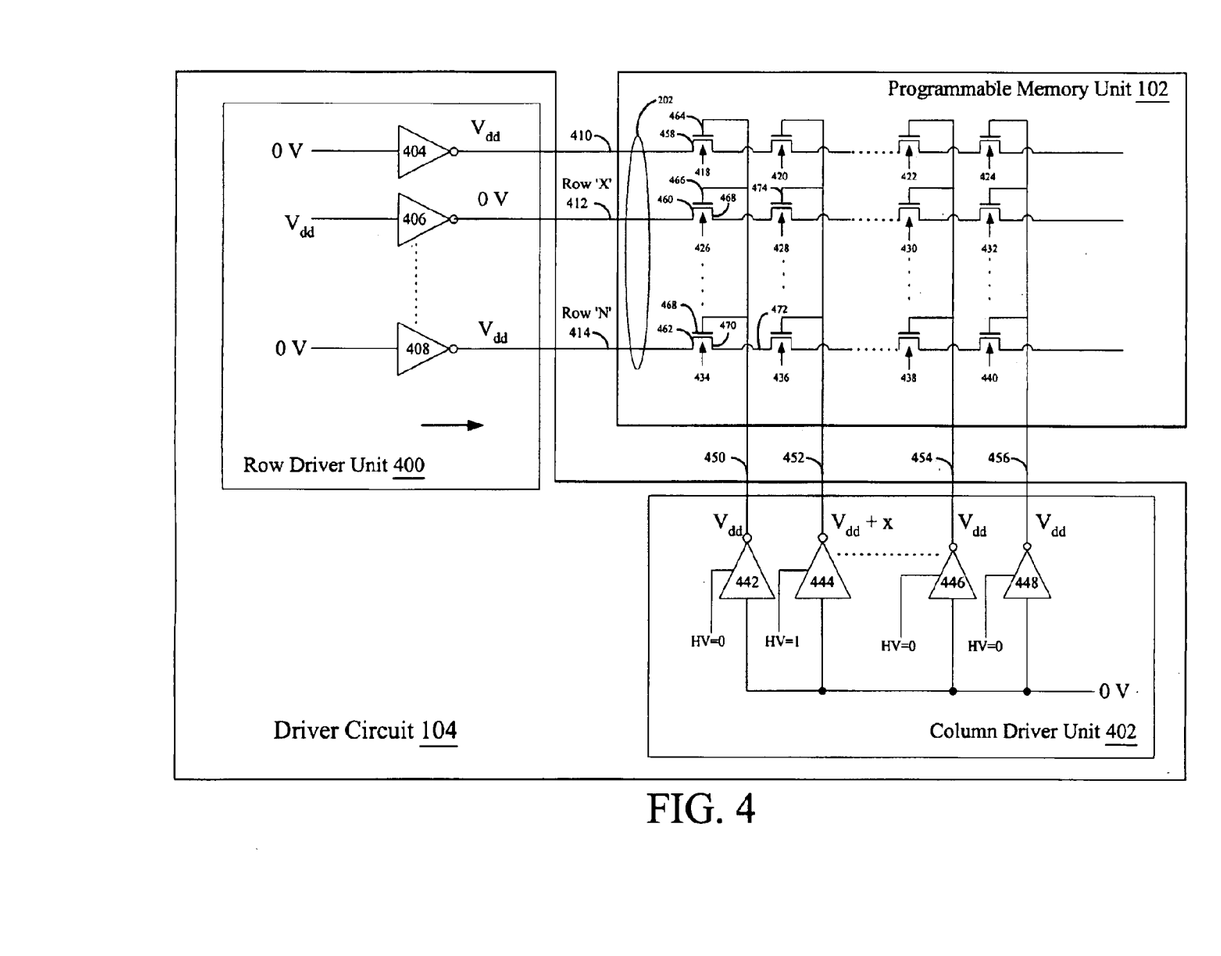
FIG. 4 is a circuit diagram illustrating an example implementation of a portion of the programmable memory unit of FIG. 2 connected to a driver circuit.

In FIG. 4 the programmable memory unit 102 and driver circuit 104 are shown. Within the driver circuit 104 are row driver unit 400 and column driver unit 402. The row driver unit 400 and column driver unit 402 are connected to programmable memory unit 102. The n rows 202 of the programmable memory unit 102 are driven by a number of inverters 404, 406 and 408, where each inverter 404, 406 and 408 drives a single row 410, 412 and 414 of transistors 418, 420, 422, 424, 426, 428, 430, 432, 434, 436, 438, and 440, respectively. Similarly, a number of high-voltage drivers 442, 444, 446 and 448 drive the columns 450, 452, 454, and 456 of transistors 401, 403, 405 and 407 in the programmable memory unit 102, where each high-voltage driver 408, 410, 412 and 414 drives a single column of transistors 418, 420, 422, 424, 426, 428, 430, 432, 434,436, 438, and 440, respectively. The inverters 404, 406, and 408 which drive the rows of transistors 410, 412 and 414 of the programmable memory unit 102 are typically referred to as row drivers and are in the row driver unit 400 and the high-voltage drivers which drive the columns 450, 452, 454 and 456 of 418, 420, 422, 424, 426, 428, 430, 432, 434, 436, 438, and 440, respectively are referred to as the column drivers and are in the column driver unit 402. Generally, the row drivers in the row driver unit 400 drive the source or drain (i.e., terminals 458, 460 and 462) of the transistors 418, 426 and 433, respectively, and the column drivers in column diver unit 402 drive the gates 464, 466 and 468. Each transistor includes three terminals (i.e., a source, a drain and a gate).

The driver circuit 104 programs (i.e., encodes) the programmable memory unit 102. Each transistor 418, 420, 422, 424, 426, 428, 430, 432, 434, 436, 438, and 440 in the programmable memory unit 102 is permanently encoded with either a logic state 1 or a logic state 0 state. In general, where a transistor (such as 434) is intended to store a logic state 0, the transistor 434 is not permanently altered. However, to store a logic state 1 state in a particular transistor (such as 426), the driver circuit 104 operates to permanently alter (i.e., break down) the gate oxide of that transistor 426. It will be appreciated to one of skill in the art that this convention may be reversed. In other words, the driver circuit 104 may operate to permanently alter the gate oxides for transistors intended to store a logic state 0, while an unaltered transistor indicates the storage of a logic state 1. In such an alternative implementation, inverters are utilized to achieve the appropriate outputs from the transistors.

As an example implementation, the programmable memory unit 102 is encoded row-by-row. In this example, it is assumed for illustration purposes, that a given row, "X" 412, is the memory location (i.e., row) being encoded. When encoding row X 412, the inverter corresponding to row X 412 (inverter 406) drives the row 412 to ground (i.e., zero), while the other rows 410 and 414 are driven to a predetermined voltage such as, $V_{dd}$, where $V_{dd}$ refers to the normal power supply voltage given to an integrated circuit chip (IC) to define a logic state 1. For a 0.35 micron minimal gate length process, $V_{dd}$ is approximately 3.3V, for a 0.25 micron minimal gate length process, $V_{dd}$ is approximately 2.5V, and for a 1.8 micron minimum gate length process, $V_{dd}$ is approximately 1.8V.

When the row driver unit 400 drives a given row (e.g., row X 412), a voltage is applied to the first terminal (e.g., 422) of the first transistor 460 in the row X 412. In general, if a voltage is also applied to the gate 466 of the transistor 426, a channel will form in the transistor 426. Once applied to the first terminal 460 of the transistor 426, the signal generated by the voltage propagates along the channel of the first transistor 426 in the row X 412, and the voltage drops off by approximately the threshold voltage at the second terminal 428 of the transistor 426. The threshold voltage of a transistor 426, referred to as "$V_{th}$," refers to the minimum gate 466 voltage required to create a channel in the transistor 426. A signal then propagates along the channel of the next transistor and passes the channel of this next transistor without any further voltage drop. This signal propagation continues along the entire row X 412. It is appreciated that if the voltage applied to a given row is zero (i.e.; ground), the voltages at the terminals (e.g., 460 and 468 for transistor 426) of each transistor 426, 428, 430 and 432 in that row 412 are also equal to zero. Furthermore, the channel voltage, Vc, for each transistor in the row is typically equal to the lower of the two terminal voltages of the transistor, when the transistor is turned on (i.e., when there exists a conductive channel).

For example, row "N" 414 may be driven to $V_{dd}$ by applying a voltage ($V_{dd}$) to the first terminal 462 of the transistor 434 in the first terminal 450 of that row N 414. When a voltage is also applied to the gate 468 of the same transistor 434, a conductive channel is formed resulting in a current from the first terminal 462 to the second terminal 470 of the transistor 434. The conductive channel results in a voltage drop from the first terminal 462 to the second terminal 470 of the transistor 434. This voltage drop is approximately equal to the threshold voltage ($V_{th}$) of the transistor 434. The voltage, then, at the second terminal 470 of the first transistor 434 in the row N 414, is ($V_{dd}-V_{th}$).

The voltage at the second terminal of a transistor in a given row is equal to the voltage at the first terminal of the next transistor in that row. Thus, since the voltage at the second terminal 470 of the first transistor 434 in the row N 414 is the same as the voltage at the first terminal 472 of the next transistor 436 in that row N 414, the voltage at the first terminal 472 of the second transistor 436 is also equal to ($V_{dd}-V_{th}$). Similarly, because no further voltage drops occur along the row N 414, each terminal of each transistor thereafter (i.e., 438 and 440) in the row N 414 is driven to ($V_{dd}-V_{th}$). Furthermore, since the channel voltage, Vc, for each of the transistors 434, 436, 438 and 440 in the row N 414 is typically equal to the lower of the terminal voltages of the transistor when the transistor is turned on, the channel voltage for each transistor 434, 436, 438 and 440 in the row N 414 is approximately equal to ($V_{dd}-V_{th}$).

Each row 410, 412 and 414 of the programmable memory unit 102 is a memory location, and generally stores a word made up of logic state 1s and 0s. Typically, a row may contain "Words of information" such as multiple addresses. Assuming there are 1,024 addresses each 24 bits wide, the addresses may be organized into an array of 256 rows each 4 words where each word is 24 bits wide. As an example, the first four bits of the word stored in row X 412 are "0100," then the transistors 426, 428, 430 and 432 in the first 450, second 452, third 454 and fourth 456 columns of row X 412 are encoded with a logic state 0, 1, 0 and 0, respectively. A logic state 1may be permanent cod ed into a transistor 426 if the gate oxide of that transistor 426 is permanently degraded or "broken down".The permanent degradation or breakdown of oxide may occur when the effective voltage applied to the oxide is at least equal to the breakdown voltage of the oxide, $V_{BD}$. In the case of a MOSFET, the effective voltage applied across the gate oxide ("the effective oxide voltage or $V_{ox}$") is approximately equal to the difference between the actual voltage applied to the gate ($V_G$), and the channel voltage ($V_c$). The channel voltage is typically equal to the lower of the terminal voltages of the transistor 426, when the transistor 426 is turned on (i.e., when there exists a conductive channel).

When row X 412 is encoded, it is driven to ground while every other row (410 and 414) is driven to $V_{dd}$. For each transistor 426, 428, 430 and 432 in row X 412 into which a logic state 1 is to be written (e.g., transistor 428), the column driver 444 corresponding to the column 452 of that transistor 428 will drive the voltage on the gate 474 of that transistor 428 to some value greater than $V_{dd}$, for example, $V_{dd}$+x. Typically, the minimum gate voltage required to permanently alter the gate oxide of a transistor is referred to as $V_{Gmin}$. $V_{Gmin}$ depends on both the voltage required to break down the oxide (referred to as $V_{BD}$, also referred to as $V_{ox}$ at breakdown) and the channel voltage in the transistor ($V_c$). Specifically, $V_{ox}=V_G-V_c$. Thus, $V_{ox}$ at breakdown (i.e., $V_{BD}$) is equal to $V_G$ at breakdown (i.e., $V_{Gmin}$) minus $V_c$. As an example, the drivers 442, 444, 446 and 448 in column driver unit 402 may be bootstrap type drivers capable of driving a gate voltage level of, for example, $V_{dd}$+3V.

In this example, the channel voltage ($V_c$) for each transistor in row X 412, is equal to zero because the corresponding row driver 406 is driving the row X 412 to ground. Also, the gates of every transistor in row X 412 that is to be encoded with a logic state 1 (i.e. transistor 420), is driven to $V_{dd}$+3 (i.e., $V_{G=Vdd}$+3). Thus, for any transistor in row X 412 that is being encoded with a logic state 1 (e.g., transistor 428), the voltage across the oxide ($V_{ox}$) will be equal to ($V_{dd}$+3)−0=($V_{dd}$+3), such that ($V_{dd}$+3) is greater than or equal to $V_{BD}$. However, because the other rows (e.g., 410 and 414) not currently being encoded are driven to $V_{dd}$ instead of to ground, the channel voltages ($V_c$) for the transistors in these rows are approximately equal to $V_{dd}-V_{th}$. Thus, none of the gate oxides of the transistors in those other rows 410 and 414 will break down even when their gates are being driven to $V_{dd}$+3. This is because for transistors in the other rows 410 and 414, whose gates are being driven to $V_{DD}$+3 rather than $V_{DD}$, $V_{ox}$ is equal to ($V_{dd}$+3)−($V_{dd}-V_{th}$)=(3+$V_{th}$), where (3+$V_{th}$) is less than $V_{BD}$.

On the other hand, for the transistors in row X 412, in which a logic state 0 is to be encoded, the corresponding column drivers (e.g., 442, 446 and 448) will drive the voltages on the respective gates of these transistors (e.g., 426, 430 and 432) to $V_{dd}$.

Thus, if a particular transistor 430 in row X 412 is to be encoded with a logic state 0, the voltage across the oxide ($V_{ox}$) will be equal to $V_{dd}$−0 (i.e., $V_G-V_C$), which is equal to $V_{dd}$, where $V_{dd}<V_{BD}$. Similarly, the voltage across the gate oxides of the transistors in these columns (i.e., the columns corresponding to transistors in row X 412 in which a logic state 0 is to be encoded) which are not in row X 412, is equal to $V_{dd}-(V_{dd}-V_{th})=V_{th}$, which is also less than $V_{BD}$.

Figure 5:
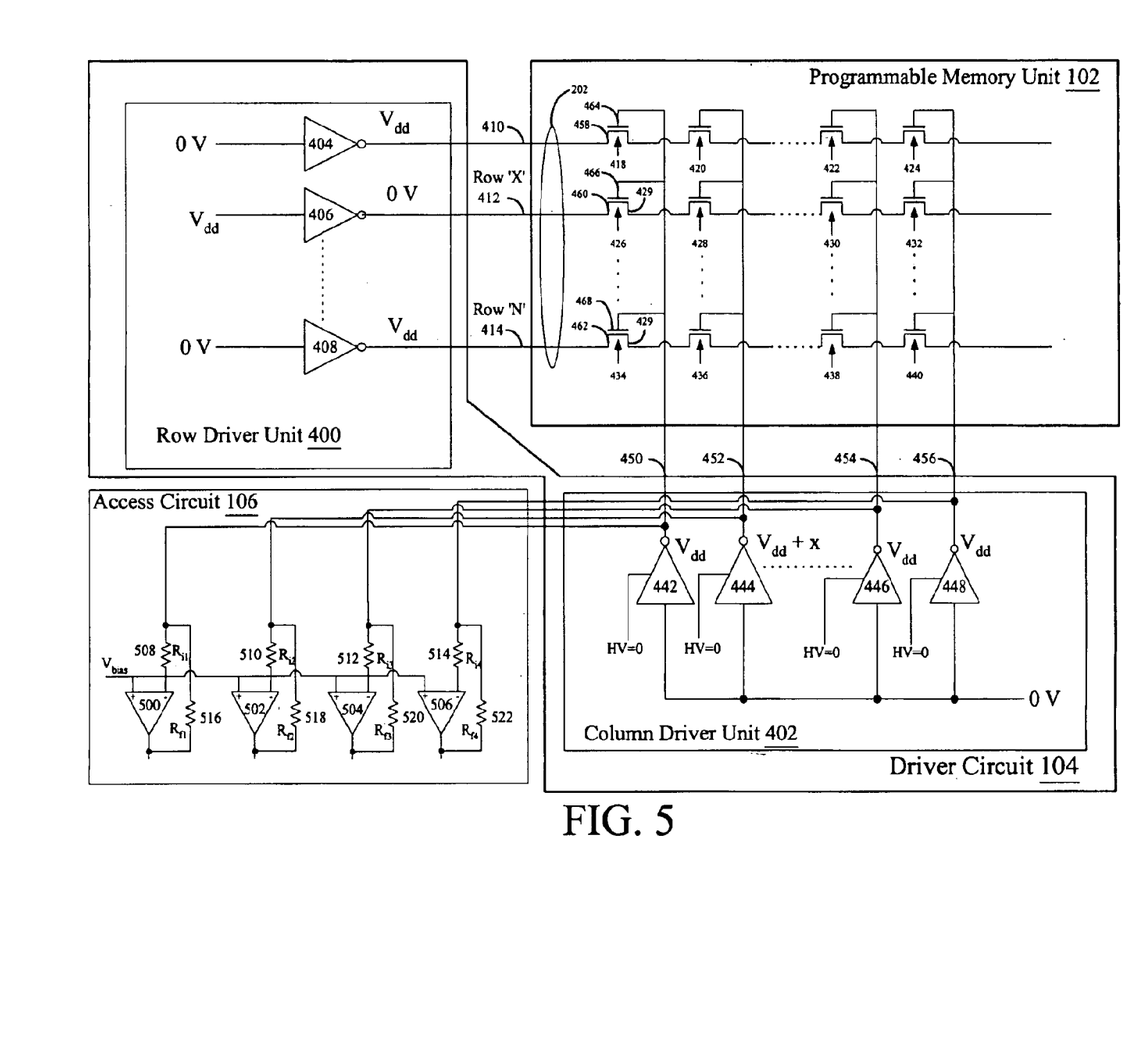
FIG. 5 is a circuit diagram illustrating an example implementation of a portion of the programmable memory unit of FIG. 2 connected to an access circuit.

In FIG. 5, a portion of the programmable memory unit 102 of FIG. 2 connected to both driver circuit 104, FIG. 1, and access circuit 106 is shown. The access circuit 106 may include a number of amplifiers 500, 502, 504 and 506. Each amplifier 502 through 506 is associated with a single column in the programmable memory unit 102. Alternatively, each amplifier 500 through 506 may be associated with more than one 15 column in the programmable memory unit 102, so that a number of columns share a read-out amplifier.

The input of each amplifier 500, 502, 504 and 506 may be electrically connected to a resistor 508, 510, 512 and 514, respectively, and each 500, 502, 504 and 506 may have a feedback resistor 516, 518, 520 and 522, respectively. In general, each read-out amplifier is capable of detecting a current flow, and outputting a logic state 1 or logic state 0, depending on the amplitude of the detected current signal at the input of the amplifier. Each amplifier 500, 502, 504 and 506 generally detects leakage current flow across the thin gate oxide of a transistor 524 in the programmable memory unit 102, and outputs a logic state 1 or logic state 0 from the transistor 524 corresponding to the state of breakdown or intactness of the gate oxide of that transistor 524. The leakage current across the gate oxide is the non-zero DC current between a gate and channel of the transistor 428. In a non-defective or non-broken down gate oxide, this leakage current is approximately zero when a non-zero DC voltage is applied between the gate and the channel (where the channel is being biased via a voltage source).

The access circuit 106 generally access and reads out data one row at a time. When a particular row (e.g., 412) is to be read out by the access circuit 106, the row driver 406 associated with that row 412 drives the row 412 to ground, while the other row drivers 404 and 408, and all of the column drivers 442, 444, 446 and 448 are tristated. Tristate is a logic state other than "0" or "1". The drivers are tristated when they do not produce any current. Because the tristated drivers 404 and 408 are not producing any current, there will be no leakage current from the gates of the transistors 418, 420, 422, 424, 434, 436, 438 and 440 in the tristated rows 410 and 414. Thus, the only signal received by the access circuit 106 amplifiers 500, 502, 504 and 506 will be the leakage current from the gates of the transistors in the row 412 currently being read out.

Because there is a voltage (0 volts as opposed to being in tristate) being applied to the transistors 426, 428, 430 and 432 of row 412, there may be a small amount of current flowing through those transistors 426, 428, 430 and 432. If transistor 426 has a gate oxide that has not been permanently altered (e.g., broken down), the small amount of current will only flow through the channel, because the intact gate oxide act as insulator preventing current from flowing through the gate. On the other hand, if a transistor has a gate oxide that has been permanently altered (e.g., broken down, such as transistor 428), the broken down oxide no longer acts as an insulator and a portion of the current flows through the transistor 428 and into the input of the respective amplifier 502. It is appreciated by one skilled in the art that the permanently altered gate oxides may indicate a logic state 0 (rather than logic state 1), while an unaltered transistor may indicate the storage of a logic state 1. This may be done by, for example, placing an inverter at the output of each of the amplifiers 500, 502, 504 and 506.

Figure 6:
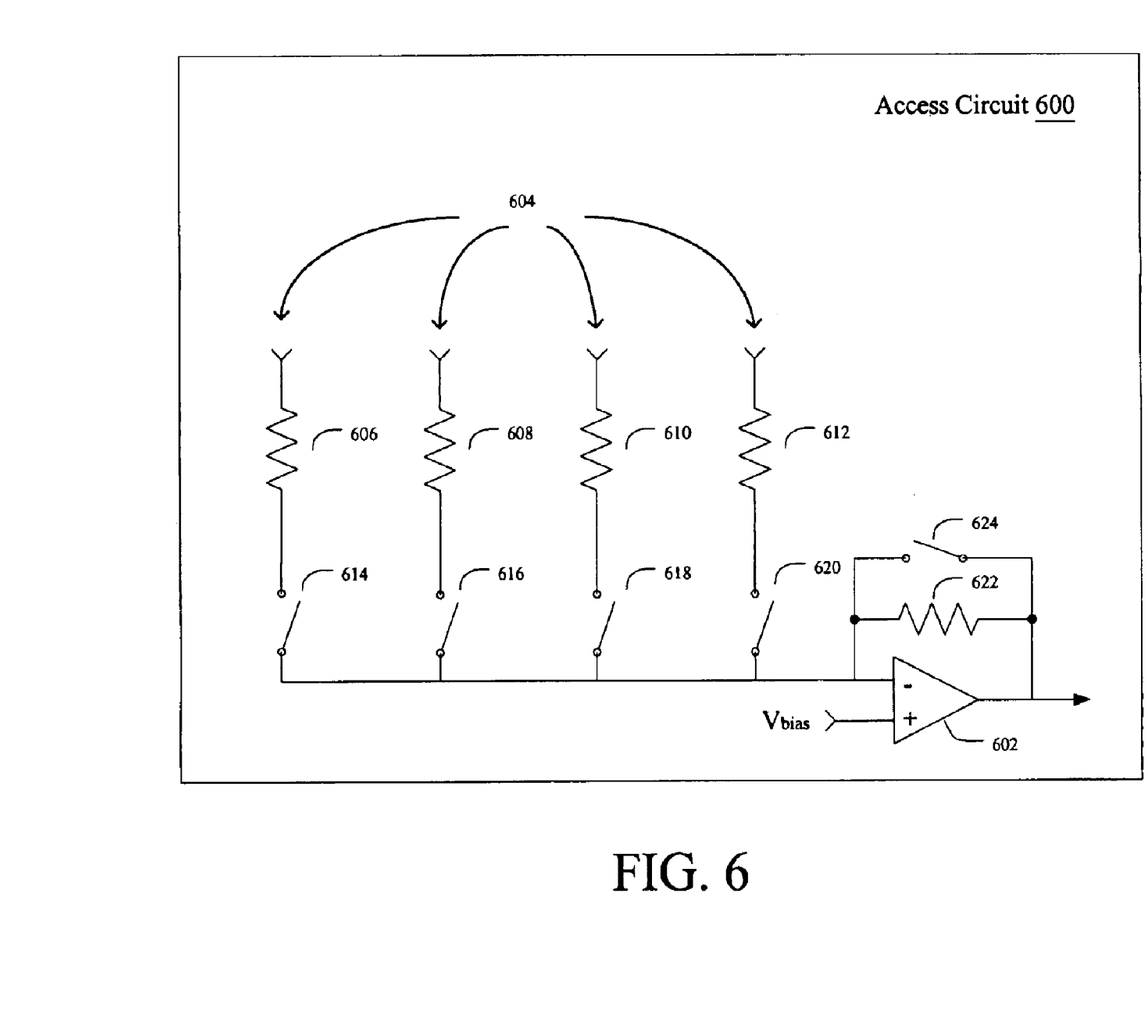
FIG. 6 is a circuit diagram illustrating a single read-out amplifier with multiple input signals that may be utilized in the OTP device of FIG. 1.

In FIG. 6, an access circuit 600 with a single amplifier 602 having multiple inputs 604 is shown. In an example implementation, the number of columns 450, 452, 454 and 456 in the programmable memory unit 102, FIG. 5, share the amplifier 602, and thus each amplifier 442, 444, 446 and 448 in the column driver unit 402 sends inputs to the amplifier 602, FIG. 6. Each input 604 to the amplifier 602 may be electrically connected to a respective resistor 606, 608, 610 and 612 that is in turn connected to a respective input switch 614, 616, 618 and 620. Each input switch 614, 616, 618 and 620 may be, for example, a NFET, PFET or CMOS switch. The amplifier 602 may further include a feedback resistor 622 and a feedback switch 624. During read-out, only one input switch (such as switch 614) is closed, while the rest are open, allowing current from one input 604 to flow into the input 626 of the amplifier 602. The amplifier 602 is biased such that its input voltage is between ground and $V_{dd}$. To prevent breakdown of the gate oxides of the switches 614, 616, 618, 620 and 622 during encoding, the switches 614, 616, 618, 620 and 622 are all turned on so that both terminals of the switches 614, 616, 618, 620 and 622 are maintained at a voltage below $V_{dd}$, and most of the high voltage is dropped across the resistors 606, 608, 610, 612 and 622.

In yet another implementation of the invention, programming a code, such as a serial number or a product identifier, in the programmable memory unit 102 uniquely identifies the OTP device 100, FIG. 1. The stored code is then available for use by a controller, such as a microprocessor, ASIC, embedded controller, or combination of discrete circuits functioning as a controller. Thus, rather than identifying the location of faulty pixels and storing the location in the programmable memory unit 102, a unique identifier is encoded into the memory storage array.

Figure 7:
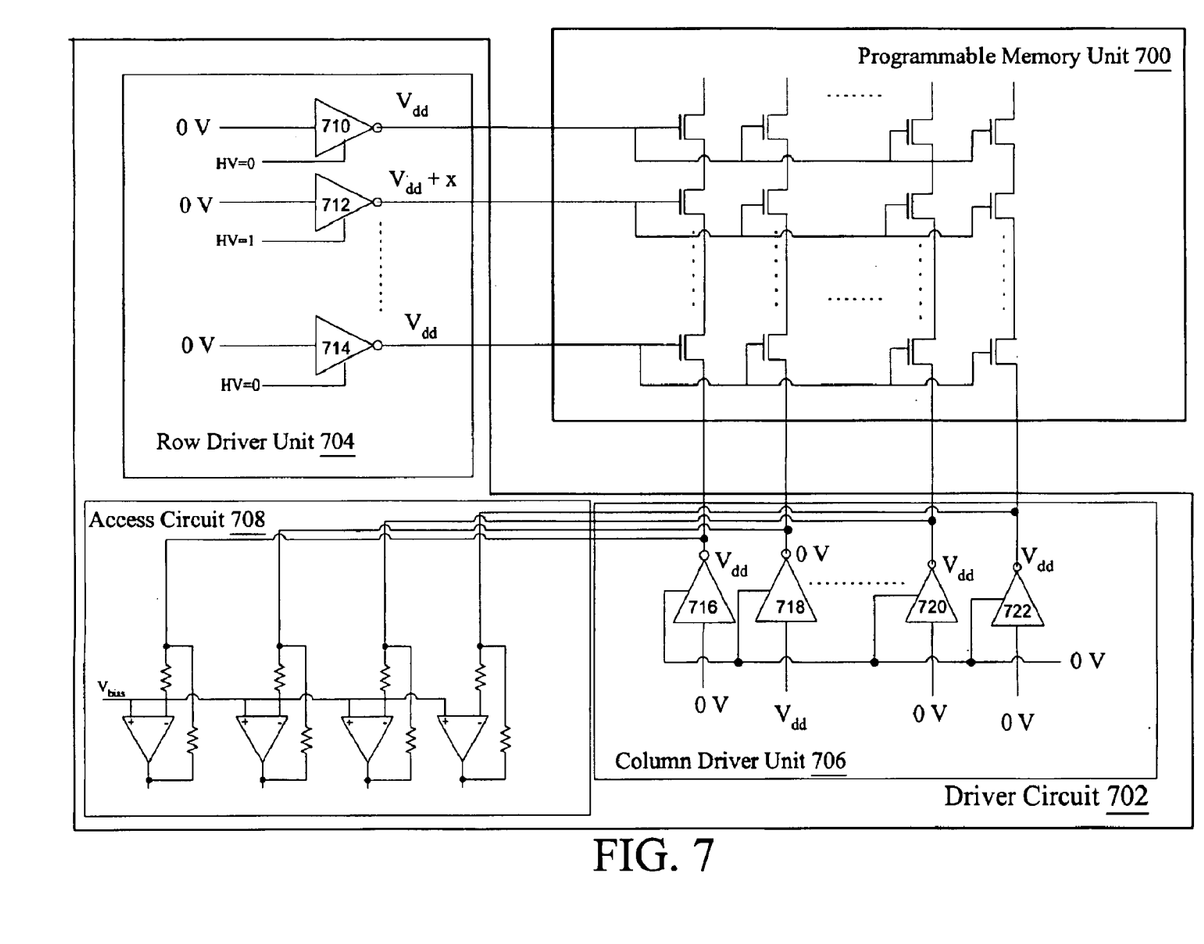
FIG. 7. is a circuit diagram illustrating another example implementation of a portion of the programmable memory unit of FIG. 2 connected to a driver circuit and an access circuit.

In FIG. 7, is another example implementation of a portion of a programmable memory unit 700 connected to a driver circuit 702 having a row driver unit 704 and column driver unit 706, and an access circuit 708. In this example, the configured of the rows and columns are reversed (as compared to the fabrication of the example implementation described in FIG. 3). In other words, the programmable memory unit 700 is configured so that the row drivers 710, 712 and 714 in the row driver unit 704 are high-voltage drivers that drive the gates of the transistors in the programmable memory unit 700, and the column drivers 716, 718, 720 and 722 in the column driver unit 706 are inverters that drive the diffusions (i.e., the terminals) of the transistors in the programmable memory unit 700.

Figure 8:
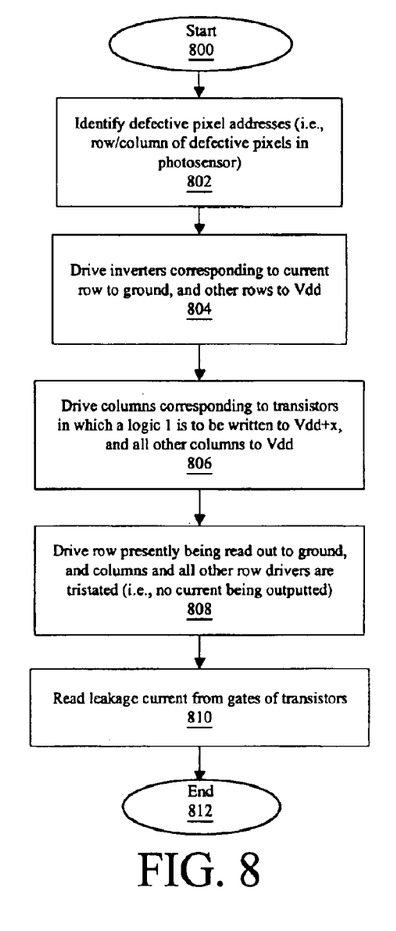
FIG. 8 is a flowchart illustrating the process of data storage and data retrieval performed by the OTP device of FIG. 1.

In FIG. 8, a flowchart illustrating the process of data storage and data retrieval performed by an example image sensor type OTP device 100, FIG. 1. The process begins in 800, FIG. 8. In step 802, the defective pixel addresses in the photosensor (not shown) are identified. An example way of identifying defective pixels in the photosensor is to uniformly expose the photosensor with incident photons for a predetermined period of time such that each pixel is exposed to the same amount of light. Next the amount of charge collected by each pixel is read out and compared with a predetermined value. Based on this comparison, a comparison signal is generated for each pixel indicating whether the pixel is defective or not, and then a list of the defective pixels is generated. This list of defective pixels typically identifies the pixels by their row and column numbers.

After the defective pixels are identified in step 802, their locations in the photsensor are encoded into the programmable memory unit 102 (FIG. 2), by driving the inverters corresponding to current row ground and the other rows to $V_{dd}$ in step 804, FIG. 8. In step 806, the columns corresponding to the transistor in which logic 1 is to be written are driven to $V_{dd}$ +X while all other columns are driven to $V_{dd}$.

The row driver unit 400, FIG. 4, and column driver unit 402, in the driver circuit 104, permanently alter the gate oxides for the transistors that are to be encoded.

Generally, each row is read out one at a time. For a row that is being read out, the row driver associated with that row drives that row to ground, while all of the other rows and columns are tristated in step 808. Then, the access circuit 106, FIG. 1, detects leakage current from the gates of the transistors in the row in step 810 to determine if the corresponding transistor is storing a logic state 1 or logic state 0. The process then ends in step 812.

While various embodiments of the application have been described, it will be apparent to those of ordinary skill in the art that many more embodiments and implementations are possible that are within the scope of this invention. Accordingly, the invention is not to be restricted except in light of the attached claims and their equivalents.

What is claimed is:

1. A one time programmable solid-state device comprising:
   a programmable memory unit embedded in a die within the one time programmable solid-state device;
   a driver circuit that programs the programmable memory unit with locations of defective pixels by programming memory cells within the programmable memory unit with a first logic value or
   a second logic value, wherein each of the memory cells is associated with a corresponding pixel location, and wherein the first logic value represents a good pixel at the corresponding pixel location and the second logic value represents a defective pixel at the corresponding pixel location, wherein the memory cells have a number of rows of memory cells and a number of columns of memory cells; and
   an access circuit that enables access to the programmable memory unit, wherein the access circuit is configured to drive one of the rows of the memory cells presently being read out to ground while tristating the columns of the memory cells and the other rows of the memory cells.

2. The one time programmable solid-state device of claim 1 wherein the number of rows of memory cells is equal to a predetermined number, and the number of columns of memory cells is equal to the predetermined number.

3. The one time programmable solid-state device of claim 1 wherein each of the memory cells is a capacitor.

4. The one time programmable solid-state device of claim 1 wherein each of the memory cells is a transistor.

5. The one time programmable solid-state device of claim 4 wherein the transistor is a field-effect transistor (FET).

6. The one time programmable solid-state device of claim 1 wherein a code is stored in the programmable memory unit.

7. The one time programmable solid-state device of claim 6 wherein the code is a serial number.

8. The one time programmable solid-state device of claim 6 wherein the code is a product identifier.

9. The one time programmable solid-state device of claim 1 wherein the solid-state device is an application specific integrated circuit (ASIC) having at least one predetermined configuration value in the programmable memory unit.

10. The one time programmable solid-state device of claim 1 wherein at least one of the memory cells is permanently encoded.

11. The one time programmable solid-state device of claim 10 wherein the at least one of the memory cells is permanently encoded by application of an effective voltage to a gate of the at least one of the memory cells, at least equal to a breakdown voltage of a gate oxide on a surface of the gate.

12. The one time programmable solid-state device of claim 1 wherein the driver circuit and access circuit are embedded in the die.

13. The one time programmable solid-state device of claim 12 wherein each of the memory cells has a gate.

14. The one time programmable solid-state device of claim 13 wherein each of the memory cells is a capacitor.

15. The one time programmable solid-state device of claim 13 wherein each of the memory cells is a capacitor.

16. The one time programmable solid-state device of claim 15 wherein the transistor is a field-effect transistor (FET).

17. The one time programmable solid-state device of claim 13 wherein a code is stored in the programmable memory unit.

18. The one time programmable solid-state device of claim 17 wherein the code is a serial number.

19. The one time programmable solid-state device of claim 17 wherein the code is a product identifier.

20. The one time programmable solid-state device of claim 13 wherein the solid-state device is an application specific integrated circuit (ASIC) having at least one predetermined configuration value in the programmable memory unit.

21. The one time programmable solid-state device of claim 13 wherein at least one of the memory cells is permanently encoded.

22. The one time programmable solid-state device of claim 21 wherein the at least one of the memory cells is permanently encoded by application of an effective voltage to a gate of the at least one of the memory cells, at least equal to a breakdown voltage of a gate oxide on a surface of the gate.

23. A method for programming a one time programmable solid-state device comprising:
   writing, with a driver circuit, to a programmable memory unit embedded in a die within the programmable solid-state device locations of defective pixels by programming memory cells within the programmable memory unit with a first logic value or a second logic value, wherein each of the memory cells is associated with a corresponding pixel location, and wherein the first logic value represents a good pixel at the corresponding pixel location and the second logic value represents a defective pixel at the corresponding pixel location, wherein the memory cells have a number of rows of memory cells and a number of columns of memory cells; and
   accessing, with an access circuit, the one time programmable solid-state device wherein the access circuit is configured to drive one of the rows of the memory cells presently being read out to ground while tristating the columns of the memory cells and the other rows of the memory cells.

24. The method of claim 23 wherein the programmable solid-state device is a solid-state imaging device.

25. The method of claim 24 further including identifying a defective pixel within the solid-state imaging device.

26. The method of claim 23 wherein the driver circuit and access circuit are embedded in the die.

27. The method of claim 26 wherein the programmable solid-state device is a solid-state imaging device.

28. The method of claim 23 wherein writing further includes storing a code in the programmable memory unit.

29. The method of claim 28 wherein the code is a serial number.

30. The method of claim 28 wherein the code is a product identifier.

31. A method of data storage comprising:
identifying an address of a defective pixel in a photosensor having a plurality of pixels arranged in a two-dimensional array in a die within a programmable solid-state imaging device
storing the address in a programmable memory unit that is embedded in the die of the solid-state imaging device;
programming memory cells within the programmable memory unit with a first logic value or a second logic value, wherein each of the memory cells is associated with a corresponding pixel location, and wherein the first logic value represents a good pixel at the corresponding pixel location and the second logic value represents a defective pixel at the corresponding pixel location, wherein the memory cells have a number of rows of memory cells and a number of columns of memory cells; and driving one of the rows of the memory cells presently being read out to ground while tristating the columns of the memory cells and the other rows of the memory cells.

32. The method of claim 31 wherein identifying includes identifying a row and a column that corresponds to the defective pixel in the photosensor.

33. The method of claim 32 wherein storing includes permanently encoding the address of the defective pixel in the programmable memory unit.

34. The method of claim 33 wherein storing further includes permanently encoding the address into a row having a plurality of transistors in the programmable memory unit, where each transistor in the plurality of transistors has a gate.

35. The method of claim 34 wherein storing further includes breaking down the gate on each transistor in the plurality of transistors that corresponds to a logic 1 in the address.

36. The method of claim 35 further including accessing the address stored in the programmable memory unit.

37. The method of claim 36 wherein accessing further includes detecting a leakage current flowing through the gate of at least one of the transistors.

38. The method of claim 37 wherein accessing further includes amplifying the detected leakage current.

39. A one time programmable solid-state device comprising:
a programmable memory unit embedded in a die within the one time programmable solid-state device;
means for programming the programmable memory unit with locations of defective pixels by programming memory cells within the programmable memory unit with a first logic value or a second logic value, wherein each of the memory cells is associated with a corresponding pixel location, and wherein the first logic value represents a good pixel at the corresponding pixel location and the second logic value represents a defective pixel at the corresponding pixel location, wherein the memory cells have a number of rows of memory cells and a number of columns of memory cells; and
means for enabling access to the programmable memory unit, wherein the means for enabling access is configured to drive one of the rows of the memory cells presently being read out to ground while tristating the columns of the memory cells and the other rows of the memory cells.

40. The one time programmable solid-state device of claim 39 wherein the number of rows of memory cells is equal to a predetermined number, and the number columns of memory cells is equal to the predetermined number.

41. The one time programmable solid-state device of claim 39 wherein the solid-state device is an application specific integrated circuit (ASIC) having at least one predetermined configuration value in the programmable memory unit.

42. The one time programmable solid-state device of claim 39 wherein the programming means and access enabling means are embedded in the die.

43. A one time programmable solid-state device comprising:
means for writing to a programmable memory unit embedded in a die within the programmable solid-state device locations of defective pixels by programming memory cells within the programmable memory unit with a first logic value or a second logic value, wherein each of the memory cells is associated with a corresponding pixel location, and wherein the first logic value represents a good pixel at the corresponding pixel location and the second logic value represents a defective pixel at the corresponding pixel location, wherein the memory cells have a number of rows of memory cells and a number of columns of memory cells; and
means for accessing the one time programmable solid-state device, wherein the means for accessing is configured to drive one of the rows of the memory cells presently being read out to ground while tristating the columns of the memory cells and the other rows of the memory cells.

44. The one time programmable solid-state device of claim 43 wherein the programmable solid-state device is a solid-state imaging device.

45. The one time programmable solid-state device of claim 43 wherein the writing means further includes means for storing a code in the programmable memory unit.

46. The one time programmable solid-state device of claim 45 wherein the code is a serial number.

47. The one time programmable solid-state device of claim 45 wherein the code is a product identifier.

48. The one time programmable solid-state device of claim 43 wherein the writing means and accessing means are embedded in the die.

49. A one time programmable-state device comprising:
means for identifying an address of a defective pixel in a photosensor having a plurality of pixels arranged in a two-dimensional array in a die within a programmable solid-state imaging device;
means for storing the address in a programmable memory unit that is embedded in the die of the solid-state imaging device;
means for programming memory cells within the programmable memory unit with a first logic value or a second logic value, wherein each of the memory cells is associated with a corresponding pixel location, and wherein the first logic value represents a good pixel at the corresponding pixel location and the second logic value represents a defective pixel at the corresponding pixel location, wherein the memory cells have a number of rows of memory cells and a number of columns of memory cells; and
means for driving one of the rows of the memory cells in the two-dimensional array presently being read out to ground while tristating the columns of the memory cells and the other rows of the memory cells.

50. The one time programmable solid-state device of claim 49 wherein the identifying means includes means for identifying a row and a column that corresponds to the defective pixel in the photosensor.

51. The one time programmable solid-state device of claim 50 wherein the storing means includes means for permanently encoding the address of the defective pixel in the programmable memory unit.

52. The one time programmable solid-state device of claim 1 wherein the driver circuit is configured to drive an inverter to ground corresponding to a row of the memory cells that are to be programmed.

53. The method of claim 23 the method further comprising driving, with the driver circuit, an inverter to ground corresponding to a row of the memory cells that are to be programmed.

54. The method of claim 31 the method further comprising driving an inverter to ground corresponding to a row of the memory cells that are to be programmed.

55. The one time programmable solid-state device of claim 39 wherein the means for programming is configured to drive an inverter to ground corresponding to a row of the memory cells that are to be programmed.

56. The one time programmable solid-state device of claim 43 wherein the means for writing is configured to drive an inverter to ground corresponding to a row of the memory cells that are to be programmed.

* * * * *